(12) United States Patent
Lee et al.

(10) Patent No.: US 8,472,392 B2
(45) Date of Patent: Jun. 25, 2013

(54) ACCESS POINT FOR PROVIDING WLAN VIRTUALIZATION, WLAN VIRTUALIZATION SYSTEM AND METHOD OF PROVIDING ACCESS TO WIRELESS COMMUNICATION NETWORK

(75) Inventors: Hee Jin Lee, Seoul (KR); Yong Hyu Kim, Seoul (KR); Seong Il Hahm, Siheung-si (KR); Chong Kwon Kim, Seoul (KR)

(73) Assignee: SNU R&DB Foundation, Seoul (KR)

( * ) Notice: Subject to any disclaimer, the term of this patent is extended or adjusted under 35 U.S.C. 154(b) by 347 days.

(21) Appl. No.: 12/787,515

(22) Filed: May 26, 2010

(65) Prior Publication Data

US 2011/0013608 A1     Jan. 20, 2011

(30) Foreign Application Priority Data

Jul. 15, 2009   (KR) .................. 10-2009-0064530

(51) Int. Cl.
*H04W 4/00*          (2009.01)
(52) U.S. Cl.
USPC .......................................... 370/329; 370/338
(58) Field of Classification Search
USPC .................................. 370/338, 329
See application file for complete search history.

(56) References Cited

U.S. PATENT DOCUMENTS

| | | | | |
|---|---|---|---|---|
| 2002/0093929 | A1* | 7/2002 | Mangold et al. | 370/336 |
| 2003/0161279 | A1* | 8/2003 | Sherman | 370/328 |
| 2005/0249137 | A1* | 11/2005 | Todd et al. | 370/311 |
| 2009/0052389 | A1* | 2/2009 | Qin et al. | 370/329 |
| 2009/0082002 | A1* | 3/2009 | Kim et al. | 455/418 |
| 2010/0103915 | A1* | 4/2010 | Ho et al. | 370/338 |

OTHER PUBLICATIONS

Sunghyun Choi et al, "802.11g CP: A Solution for IEEE 802.11g and 802.11b Inter-Working," *In Proceedings of the 57th IEEE Semiannual Vehicular Technology Conference (VTC 2003—Spring)*, Apr. 22-25, 2003, pp. 690-694, vol. 1, IEEE, Piscataway, NJ, USA.
Matthew S. Gast, "A Peek Ahead at 802.11n: MIMO-OFDM," *802.11 Wireless Networks: The Definitive Guide*, Apr. 2005, pp. 311-342, Second Edition, O'Reilly Media, Inc. Sebastopol, CA, USA.

\* cited by examiner

*Primary Examiner* — Sai-Ming Chan
(74) *Attorney, Agent, or Firm* — NSIP Law

(57) ABSTRACT

The present invention relates to a WLAN virtualization system which is capable of efficiently separating a Basic Service Set (BSS) into a plurality of virtual BSSs in a Time Division Multiplexing (TDM) manner. The WLAN virtualization system includes an Access Point (AP) for providing a plurality of vBSSs, and a plurality of stations corresponding to the vBSSs provided by the AP. Each of the vBSSs is operated on a superframe basis, the superframe being scheduled by a beacon frame transmitted from the AP. The superframe includes the beacon frame, one contention-free period, and one contention period. The CPs of the vBSSs include intervals which do not overlap each other. The vBSSs can be classified into any groups designated by a service provider based on certain criteria such as physical layer, QoS, security level, or network access authority, and times can be allocated to superframes at different rates or frequencies.

18 Claims, 10 Drawing Sheets

ACCESS POINT FOR PROVIDING WLAN VIRTUALIZATION, WLAN VIRTUALIZATION SYSTEM AND METHOD OF PROVIDING ACCESS TO WIRELESS COMMUNICATION NETWORK

BACKGROUND OF THE INVENTION

1. Field of the Invention

The present invention relates, in general, to an Access Point (AP) for providing Wireless Local Area Network (WLAN) virtualization, a WLAN virtualization system, and a method of providing access to a wireless communication network using the AP, and, more particularly, to a WLAN virtualization system which is capable of efficiently separating a Basic Service Set (BSS) into a plurality of virtual BSSs in a Time Division Multiplexing (TDM) manner.

2. Description of the Related Art

A virtual Access Point (virtual AP) is a technology for configuring a plurality of logical APs using a single physical AP. When a plurality of virtual APs is configured using a single physical AP, it gives a large advantage in that a plurality of network services can be provided using a single AP. That is, the costs of installing and managing APs can be reduced and the problems of interference and collisions occurring when a plurality of physical APs is present can be mitigated.

For example, in the case of services in an airport, there may be a need to add a WLAN service for ordinary tourists in a situation in which a WLAN is currently being used for a computerized operation such as ticketing. In this case, user groups belonging to the two types of services require different types of authority to gain access to the network and different security levels as well. In order to provide such differential services, a virtual AP can be used instead of installing additional APs.

A conventional virtual AP technique is implemented using a plurality of Service Set IDentifiers (SSIDs). A plurality of virtual APs having different SSIDs may publicize their SSIDs and capability sets. However, in this case, a problem arises in that it is impossible to dedicate separate wireless resources to individual groups or to avoid interference between wireless service areas. That is, wireless resources and wireless services of virtual service groups cannot be isolated from each other.

In a WLAN virtualization system, restrictions occurring when wireless resources are not isolated can be described using the above example applied to the airport. For example, when a malicious user disguises himself or herself as a passenger and carries out a Denial of Service Attack (DOS attack), he or she encroaches all of the wireless resources of a relevant AP, thus resulting in airport operations being made difficult to conduct.

Meanwhile, as an example of a new application enabling performance improvements when the WLAN virtualization system virtualizes wireless resources, there is wireless backward compatibility problem. When WLAN standards are upgraded, and as a result, a conventional legacy device and a newly introduced device coexist, the problem of backward compatibility occurs. Newly established standards provide several coexistence schemes with legacy devices, for example, protection mechanisms, but it is difficult to apply such coexistence schemes to various cases, or there are a number of disadvantages in terms of cost and resource efficiency.

SUMMARY OF THE INVENTION

Accordingly, the present invention has been made keeping in mind the above problems occurring in the prior art, and an object of the present invention is to provide a WLAN virtualization method and apparatus, which can guarantee the independency of the resources and bandwidth between any virtual basic service sets.

Another object of the present invention is to provide a method and system, which can obtain high throughput without causing collisions in transmission between stations when the present invention is applied to an environment in which a WLAN station based on the most recent technology and a legacy station coexist.

In order to accomplish the above objects, the present invention provides an Access Point (AP), the AP providing access to a wireless communication network to a plurality of stations corresponding to a plurality of virtual Basic Service Sets (vBSSs), wherein each of the vBSSs is operated on a superframe basis, the superframe being scheduled by a beacon frame transmitted from the AP, the superframe includes the beacon frame, one Contention-Free Period (CFP), and one Contention Period (CP), and the CPs of the vBSSs are scheduled to include intervals which do not overlap each other.

The vBSSs may be classified according to any scheme at a request of a service provider, and the criteria for classification can be the physical layer, Quality of Service (QoS), a security level, or network access authority.

Preferably, the beacon frame includes a length of the CFP and a size of the superframe.

Preferably, the superframe is formed such that a superframe of a vBSS defined later is delayed by a CP of a vBSS defined earlier, and the beacon frame may be transmitted during a CFP of another vBSS.

The superframe may further include a guard time after the CP. When the vBSSs are classified into stations which use different Wireless Local Area Network (WLAN) standards, the superframe may be scheduled such that a CP of a vBSS based on a WLAN standard of recent technology is located at a latter place, and the guard time may be inserted only after a CP of a superframe located at a last place.

The superframe may further include, after the CFP, a CF-End control frame enabling the CFP to terminate earlier than a scheduled time. Further, when the vBSSs are classified into stations which use different WLAN standards, the superframe may be scheduled such that a CP of a vBSS based on a WLAN standard of recent technology is located at a latter place and the CF-End control frame may be inserted only after CFPs of remaining superframes excluding a superframe located at a last place.

The superframe may further include, after the CP, a first downlink interval used to transmit a packet from the AP to a corresponding station. Further, the AP may observe whether a remaining CP is less than that required for packet transmission, when the remaining CP is greater than that required for packet transmission, the AP performs downlink transmission during the first downlink interval, and when the remaining CP is less than that required for packet transmission, the AP may delay downlink transmission.

The superframe may further include, before the CP, a second downlink interval used to transmit a packet from the AP to the station.

The AP may allocate times to superframes corresponding to the plurality of vBSSs at different rates or frequencies.

Further, the present invention provides a Wireless Local Area Network (WLAN) virtualization system, the system including an Access Point (AP) for providing a plurality of virtual Basic Service Sets (vBSSs), and a plurality of stations corresponding to the vBSSs provided by the AP, wherein each of the vBSSs is operated on a superframe basis, the superframe being scheduled by a beacon frame transmitted from the AP, the superframe includes the beacon frame, one Contention-Free Period (CFP), and one Contention Period (CP), and the CPs of the vBSSs include intervals which do not overlap each other.

Preferably, each of the stations of the vBSSs sets up a Network Allocation Vector (NAV) so as not to contend for transmission with other stations during the CFP.

The vBSSs may be classified according to any scheme at a request of a service provider, and, preferably, the CPs of the vBSSs do not overlap each other.

In addition, the present invention provides a method of providing access to a wireless communication network, in which an Access Point (AP) provides access to the wireless communication network to a plurality of stations corresponding to a plurality of virtual Basic Service Sets (vBSSs), comprising the AP transmitting a beacon frame required to schedule a superframe corresponding to an operation cycle of each vBSSs, wherein the superframe includes the beacon frame, one Contention-Free Period (CFP), and one Contention Period (CP), and wherein the CPs of the vBSSs include intervals which do not overlap each other.

DESCRIPTION OF THE PREFERRED EMBODIMENTS

The advantages and characteristics of the invention and methods for accomplishing them will become more apparent from the following embodiments which will be described in detail in conjunction with the accompanying drawings. However, the present invention is not limited to the following embodiments, but may be implemented in a variety of manners. These embodiments are provided to complete the disclosure of the present invention and to help those having ordinary skill in the art to understand the scope of the present invention. The present invention is defined only by the claims. Meanwhile, the terms used in the specification are provided to describe the embodiments, but are not intended to limit the present invention. In the specification, a singular form, unless specially mentioned otherwise, can include a plural form. The terms 'include(s) or comprise(s)' and 'including or comprising' used in the specification are not intended to exclude the existence or addition of one or more other components, steps, operations, and/or elements from a mentioned component, step, operation, and/or element.

Hereinafter, embodiments of the present invention will be described in detail with reference to the accompanying drawings.

According to an embodiment of the present invention, a single physical Access Point (AP) functions as a plurality of virtual APs corresponding to a plurality of groups classified in order to provide different network services. The AP periodically transmits beacons corresponding to respective virtual Basic Service Sets (vBSSs), and enables a new station to be associated with a proper virtual AP when the new station intends to access the AP. Once an association is made, the station listens to control packets issued only from its virtual AP, ignoring control packets from other virtual APs. Accordingly, the stations of each group can be collectively controlled via AP virtualization.

Figure 1:
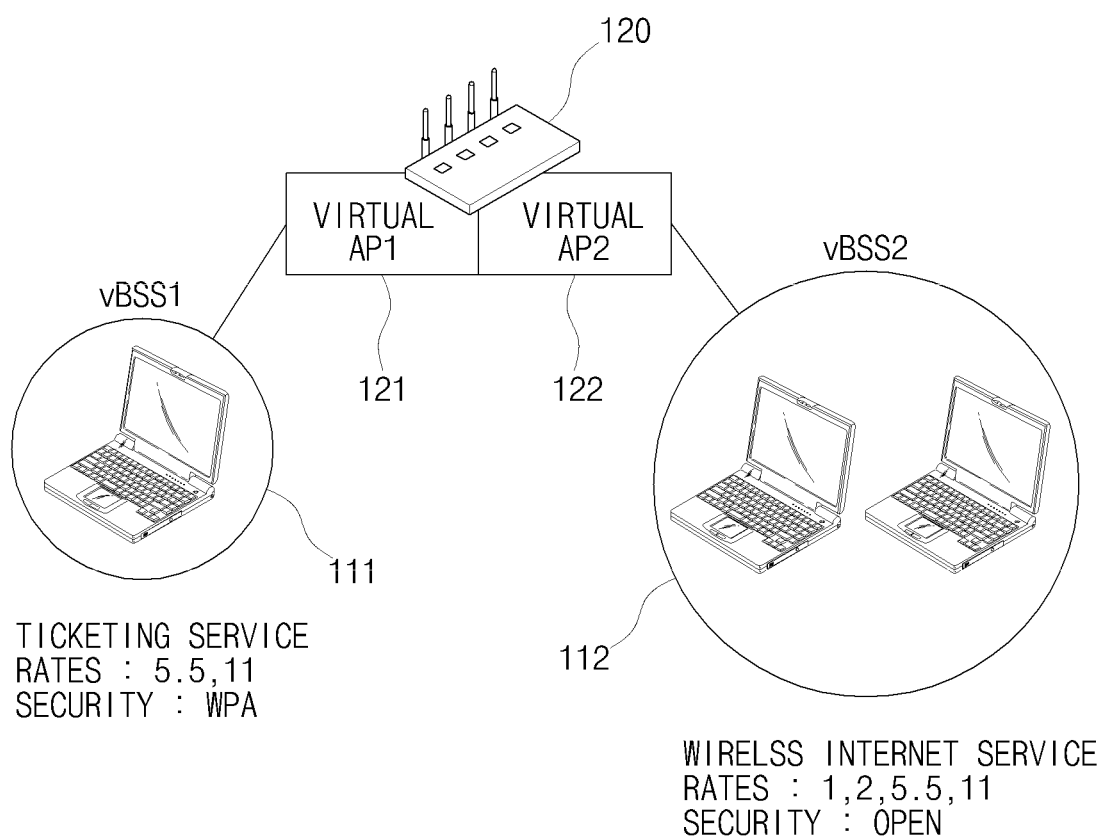
FIG. 1 is a diagram showing the construction of a WLAN virtualization system according to an embodiment of the present invention.

FIG. 1 is a diagram showing the construction of a WLAN virtualization system according to an embodiment of the present invention.

As shown in FIG. 1, the WLAN virtualization system according to the embodiment of the present invention includes a single AP 120 and a plurality of stations. The stations may be grouped into two or more vBSSs depending on the contents of services provided thereto. In the embodiment of FIG. 1, for convenience of description, an example in which the stations are grouped into two vBSSs 111 and 112 is illustrated.

The AP 120 generates two virtual APs 121 and 122 corresponding respectively to the vBSSs 111 and 112.

The vBSSs can be classified according to any scheme at the request of a service provider. For example, physical layer, the Quality of Service (QoS), the security level, the network access authority, etc. may be criteria for the classification.

According to an embodiment of the present invention, wireless resources are allocated in a Time Division Multiplexing (TDM) manner. In order to implement a coexistence mechanism, a Point Coordinate Function (PCF) and a Distributed Coordinate Function (DCF) are used. During a PCF period, an individual station cannot transmit frames unless it is polled by the AP. During a DCF period, the stations contend with each other for association. Based on the criteria, PCF and DCF alternate with each other, and thus one superframe includes one Contention-Free Period (CFP) followed by one Contention Period (CP).

The structure of such a superframe can be established by broadcasting beacon frames. Each of the beacon frames is broadcasted with the length of a CFP and the size of the superframe (that is, beacon interval) specified in the beacon frame. Each station belonging to a vBSS sets up a Network Allocation Vector (NAV) so as not to contend for transmission with other stations during the CFP.

When the management of the virtualized AP is performed by the following process in conformity with existing standards, as described above, virtualization at the level of wireless resources can be achieved. The superframe of each of the vBSSs 111 and 112 is delayed by its own CP duration. That is, in order to prevent collisions between consecutive CPs, the WLAN virtualization system of the present invention schedules the CPs of the vBSSs 111 and 112 so that they have intervals which do not overlap each other.

For example, it is assumed that the vBSS 111 is required for the ticketing system of an airport and that the vBSS 112 is required for users who are using the wireless Internet in the airport. A station desiring to be newly provided with a service receives beacons periodically transmitted from the AP 120, and the AP 120 is associated with the virtual AP 121 or 122 to which the new station corresponds. Once the association is made, the station listens to control packets transmitted only from its own virtual AP, ignoring control packets from other virtual APs. Accordingly, the stations of each group can be collectively controlled by AP virtualization.

Figure 2:
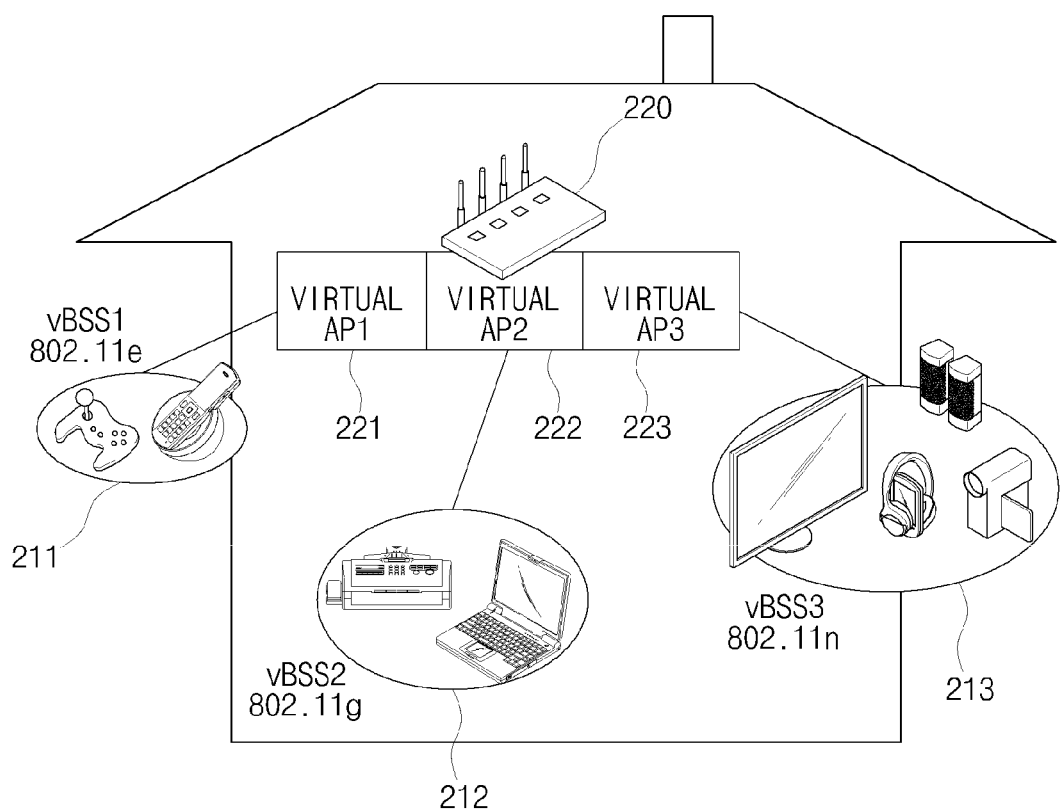
FIG. 2 is a diagram showing the construction of a in home WLAN virtualization system according to an embodiment of the present invention.

Another embodiment of the present invention may be present in a home environment in which various wireless stations are deployed. FIG. 2 is a diagram showing the construction of a WLAN virtualization system in home according to an embodiment of the present invention.

In home, various wireless communication stations, such as an Internet phone, a game controller, a notebook computer, a printer, a High Definition Television (HDTV), and an audio system, may coexist. When WLAN access is desired to be provided to various stations using a single AP, the WLAN virtualization system according to the embodiment of the present invention can be used.

As shown in FIG. 2, various stations in home may use different WLAN standards. For example, the Internet phone and the game controller use 802.11e, the notebook computer and the printer use 802.11g, and the HDTV and the audio system use 802.11n. The stations in home can be grouped into three vBSSs 211, 212, and 213 depending on their WLAN standards.

For those three vBSSs 211, 212, and 213, the AP 220 generates three virtual APs 221, 222, and 223 corresponding to the respective vBSSs 211, 212, and 213.

Meanwhile, in the embodiment of the present invention, each station is merely provided with a service based on AP virtualization, and does not need to be changed separately. That is, depending on the grouped vBSSs, the AP generates virtual APs and provides services for the respective vBSSs, thus obtaining the advantage of easy implementation.

Hereinafter, an example of the superframe schedule of an AP for providing a WLAN virtualization method according to an embodiment of the present invention will be described. For convenience of description, the case where two virtual groups exist will be described as an example. In this example, it is assumed that the two virtual groups respectively include stations which use different WLAN standards, that is, 802.11g and 802.11n. However, the present embodiment is merely exemplified hereby, and is not intended to limit the scope of the present invention. That is, the present invention can provide virtualization to three or more virtual groups. As described above, the virtual groups not only use different WLAN standards, but also can be divided on the basis of any criteria according to the selection of a service provider.

Figure 3:
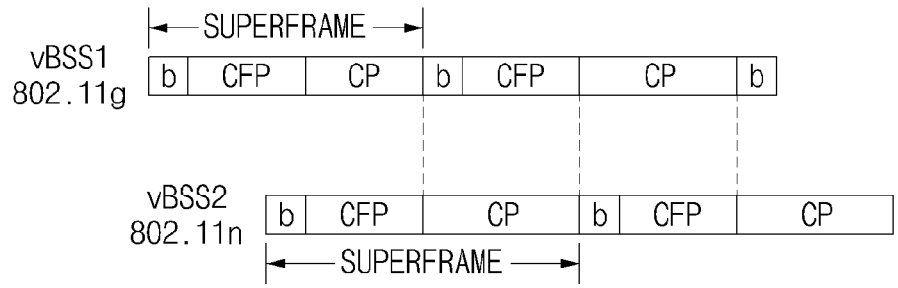
FIG. 3 illustrates an example of a superframe schedule according to a first embodiment of the present invention, wherein two virtual groups can share the AP without competition when two virtual groups using different WLAN standards exist.

FIG. 3 illustrates an example of a superframe schedule according to a first embodiment of the present invention, wherein two virtual groups can share the AP without competition when two virtual groups using different WLAN standards, that is, two virtual groups including 802.11g and 802.11n stations, exist.

As shown in FIG. 3, each superframe starts with a beacon frame indicated by "b", and is composed of one CFP followed by one CP. Each of stations in the vBSSs sets up a NAV so as not to contend for transmission with other stations during a CFP, and each of superframes in the vBSSs is delayed by its CP duration, as described above.

The virtual AP corresponding to each vBSS must transmit a beacon frame at a proper time so that its CFP can cover all CPs of other vBSSs. That is, before transmitting a data packet, the virtual AP transmits a beacon frame first.

In the first embodiment of the present invention shown in FIG. 3, the relevant virtual AP transmits the beacon frame at the time point at which its CP terminates and the CP of the other vBSS starts.

However, the transmission time of a beacon frame is not necessarily identical to the start time of the CP of the other vBSS, as shown in FIG. 3.

Figure 4:
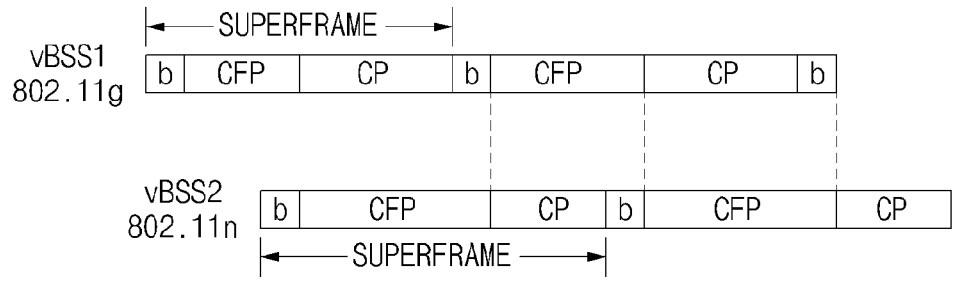
FIG. 4 is a diagram showing an example of a superframe schedule according to a second embodiment of the present invention, wherein a beacon frame is transmitted before the CP of the other vBSS starts.

FIG. 4 is a diagram showing an example of a superframe schedule according to a second embodiment of the present invention, wherein a beacon frame is transmitted before the CP of the other vBSS starts.

As shown in FIG. 4, in the second embodiment of the present invention, a relevant virtual AP transmits a beacon frame after its CP has terminated and before the CP of the other vBSS starts.

Further, a beacon frame is not necessarily synchronized with a CP, and may be transmitted earlier than the CP of the other vBSS. In particular, when two or more groups having different Inter-Frame Spaces (IFSs) exist, it may be profitable to transmit a beacon frame during the CFP so as to prevent collisions.

Meanwhile, the frame which started to be transmitted during the CP may continue to be transmitted even if the CP duration terminates, and thus there is the possibility of a collision with other groups. That is, if one virtual AP schedules its CP as soon as the CP of the other virtual AP completes, then a collision may occur when there is an extended frame transmission in the previous CP.

Figure 5:
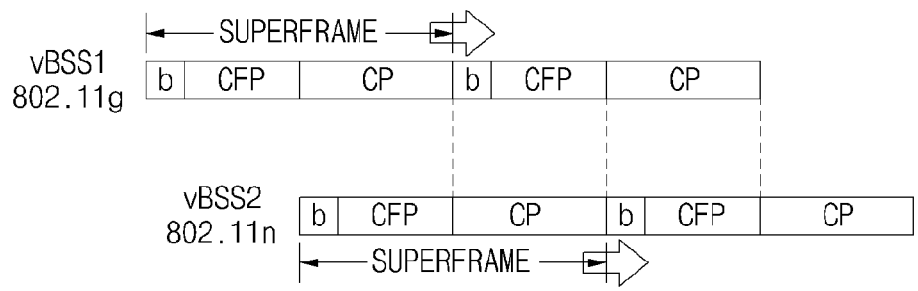
FIG. 5 shows an example of a collision when there is an extended data transmission.

An example of the case where a collision occurs in this way is shown in FIG. 5. That is, when the transmission of a data packet starts during the CP of a relevant vBSS, but the CP terminates before the transmission of the packet is completed, and the NAV of a subsequent vBSS is reset and the subsequent vBSS participates in the competition, a collision is expected to occur. The maximum collision period is the time required for the transmission of one packet. In the case of a network having a small load, the occurrence of a collision at the boundary of the CP is not a serious problem, but, for the purpose of the stable operation of the WLAN system, a guard time is provided after the CP as the most basic access method, thus preventing a collision from occurring.

Figure 6:
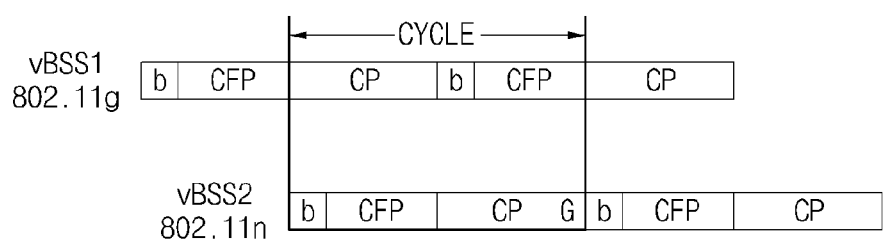
FIG. 6 is a diagram showing an example of a superframe schedule according to a third embodiment of the present invention, wherein a guard time is included in a superframe.

FIG. 6 is a diagram showing an example of a superframe schedule according to a third embodiment of the present invention, wherein a guard time is included in a superframe.

As shown in FIG. 6, a guard time is inserted into the CP to prevent a collision at the boundary of a CP, so that one superframe is composed of a beacon frame b, a CFP, a CP, and a guard time G. All vBSSs are in the CFP during the guard time.

Meanwhile, in the backward compatibility example, a guard time does not need to be inserted into all CPs and only needs to be added to 802.11n vBSS which uses the most recent technology. Since all WLAN standards have been designed to maintain backward compatibility, an 802.11n station does not interfere with the transmission of an 802.11g or 802.11b station. However, since the reverse is not generally true, it is preferable to insert a guard time to protect the transmission of the 802.11n station. To omit the insertion of a guard time in a legacy station based on the conventional technology, it is preferable to schedule CPs so that the CP of a vBSS based on the most recently developed technology is located at the last place in conformity with the sequence of advancement of base technology of stations, for example, in the sequence of 802.11b/802.11g/802.11n. By allocating latter defined technologies to more delayed vBSSs, extended CP transmission by earlier defined physical layer (PHY) can be protected by latter defined PHY.

In FIG. 6, vBSS1 and vBSS2 are allocated to 802.11g and 802.11n, respectively, so the first extended CP can be protected without guard time. Thus, only the last CP of a TDM cycle needs guard time against hidden accesses from legacy PHYs.

A guard time is required so as to prevent a collision at the CP boundary, but, on the contrary, it is wasted unless there are extended transmissions. Thus, it must be considered to be overhead. In order to eliminate the possible waste of guard time, a CF-end control frame enabling a CFP to terminate earlier than the scheduled time can be used. Further, since a guard time can be considered to be a part of the CFP, the AP uses the guard time for downlink transmission, thus realizing improvements in performance. Individual embodiments will be described later.

Figure 7:
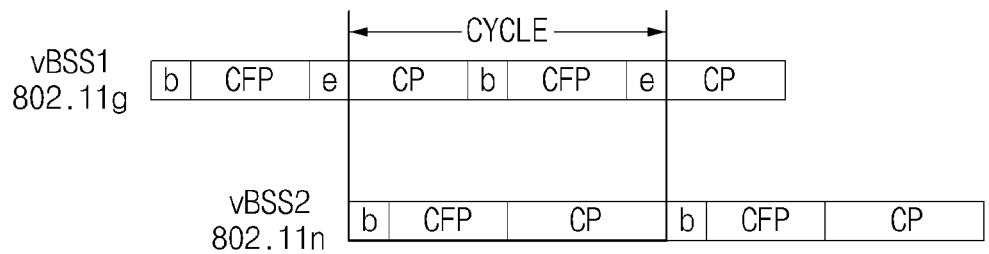
FIG. 7 is a diagram showing an example of a superframe schedule according to a fourth embodiment of the present invention, wherein a CF-End control frame is used.

FIG. 7 is a diagram showing an example of a superframe schedule according to a fourth embodiment of the present invention, wherein a CF-End control frame is used. In FIG. 7, the CF-End control frame is indicated by "e".

In FIG. 7, the CF-End control frame is inserted only into the superframe of a vBSS1 usiing 802.11g. The reason for this is that, when the most recent PHY is used, signals which use the previous PHYs can be decoded, and thus a vBSS2 can understand the transmission in the vBSS1.

That is, according to the fourth embodiment of the present invention, a superframe including a guard time is scheduled, but the AP observes whether the remaining CP is less than that required for the transmission of packets or whether no activity occurs during the guard time. As a result of the observation, when the remaining CP is less than that required for the transmission of packets or when no activity occurs during the guard time, the AP transmits the CF-End control frame, thus allowing the subsequent CP to start earlier than the scheduled time.

However, since the amount of transmission is less than the previously scheduled time, a CF-End control frame can be optionally used to reduce the time duration. In this case, a CF-End control frame can also be inserted into other superframes if necessary.

According to the above-described fourth embodiment of the present invention, the possible waste of guard time can be prevented, but overhead occurs due to the use of an additional CF-End control frame. However, since the time required to transmit the CF-End control frame is less than the guard time in a specific data rate range, such an embodiment may be advantageous in some cases.

Figure 8:
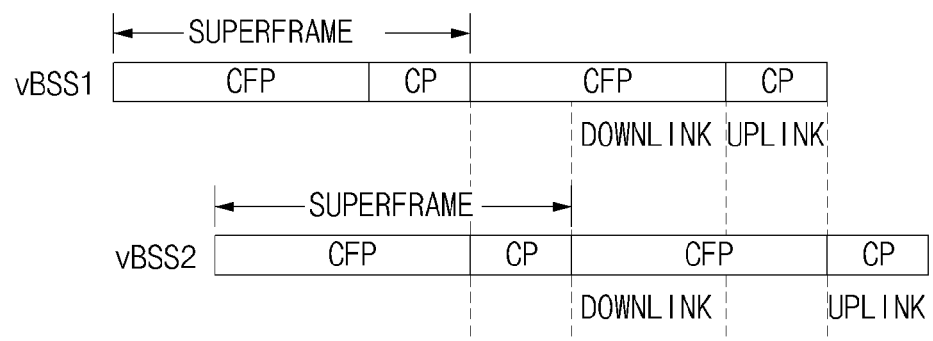
FIG. 8 is a diagram showing an example of a superframe schedule according to a fifth embodiment of the present invention, wherein an AP uses the remaining guard time for downlink transmission.

FIG. 8 is a diagram showing an example of a superframe schedule according to a fifth embodiment of the present invention, wherein an AP uses the remaining guard time for downlink transmission.

As shown in FIG. 8, an interval into which a guard time is to be inserted after a CP may be used by the AP for downlink transmission. This is possible because the guard time is still a part of a CFP and is then controlled by the AP, and because the AP can recognize extended transmissions in the previous CP even if there are any extended transmissions in the previous CP. That is, the AP observes whether the remaining CP is less than that required for packet transmission. If there is no packet transmission activity during the guard time, the AP utilizes the guard time for downlink transmission, otherwise the AP can avoid a collision by delaying an attempt to perform downlink transmission.

In particular, since the CFP used for a downlink is a contention-free period, the MAC protocol overhead is small, and thus it gives high efficiency. Therefore, when a downlink occupies a large portion of network traffic, high throughput can be obtained.

Figure 9:
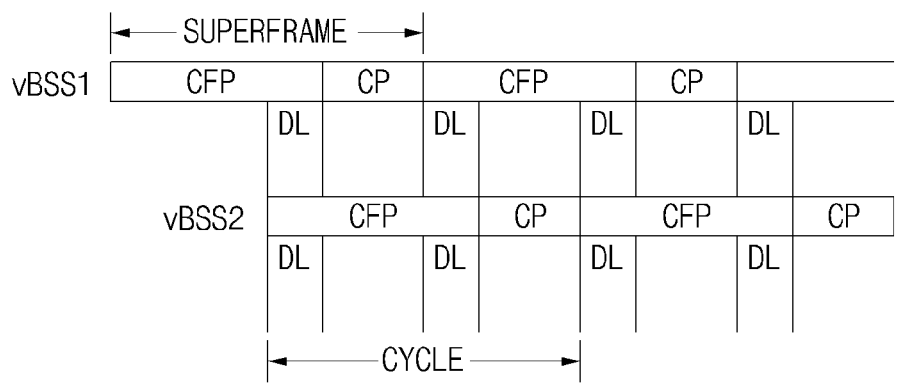
FIG. 9 is a diagram showing an example of a superframe schedule according to a sixth embodiment of the present invention, wherein optional downlink intervals are arranged for all CPs.

Meanwhile, such a downlink interval can be optionally arranged to every CP. FIG. 9 is a diagram showing an example of a superframe schedule according to a sixth embodiment of the present invention, wherein optional downlink intervals are arranged for all CPs.

In the case of a typical virtualization system which does not use a protection mechanism, a collision problem may arise when transmission is extended and exceeds CP durations during all CPs, as well as during the last CP. In this case, a downlink interval can be arranged after the CP in which the problem occurs to solve the collision problem.

Further, downlink intervals are flexibly arranged, thus guaranteeing Quality of Service (QoS).

Figure 10:
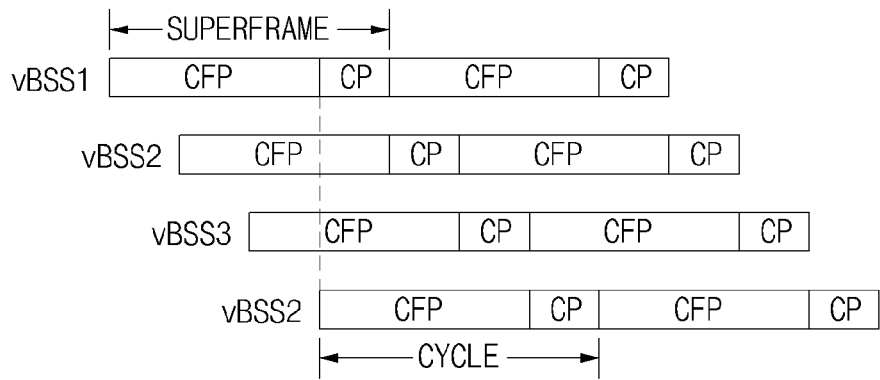
FIG. 10 is a diagram showing an example of a Time Division Multiplexing (TDM) manner according to a seventh embodiment of the present invention, wherein access opportunities are allocated differently according to the circumstances.

In relation to the guaranteeing of QoS, the vBSSs can be activated at different rates. FIG. 10 is a diagram showing an example of a Time Division Multiplexing (TDM) manner according to a seventh embodiment of the present invention, wherein the access opportunities are allocated differently according to the circumstances.

As shown in FIG. 10, after vBSS1, vBSS2 and vBSS3 have been sequentially activated, vBSS2 other than vBSS1 is activated, and then, such an alternation cycle is repeated. Here, vBSS2 may be a vBSS having high QoS priority.

As described above, according to the present invention, it is impossible to avoid overhead attributable to the use of additional control frames such as a beacon, a guard time, and a CF-End control frame. Therefore, the overhead has been estimated so as to detect the influence of such an overhead on performance. One cycle is defined as the duration from the beginning of one beacon to the next beacon for the same vBSS. Further, it is assumed that every group has one CP in each cycle. If there are m groups, then m beacons appear in one cycle. In the third embodiment using a guard time, this cycle also contains the same guard time as the transmission time of the most recent PHY frame. In the fourth embodiment using a CF-End control frame, this cycle contains one CF-End control frame.

As a result of simulation, the third embodiment cannot support QoS requirements of real-time applications because a CP appears once per cycle. A frame generated during a CFP must wait for the next CP. This waiting time may be as long as the entire cycle length in the worst case. Therefore, to reduce such latency, shorter cycles must be used, but there is a problem in that short cycles may induce relatively large overhead. The reason for this is that the overhead is constant regardless of the size of the cycle.

FIGS. 11 to 16 are graphs showing the results of simulations. In FIGS. 11 to 16, curves indicated by 'Virtualized Coexistence (VCOX)', 'VCox' and 'sVCOX' show the results of the simulation according to the embodiments of the present invention.

Figure 11:
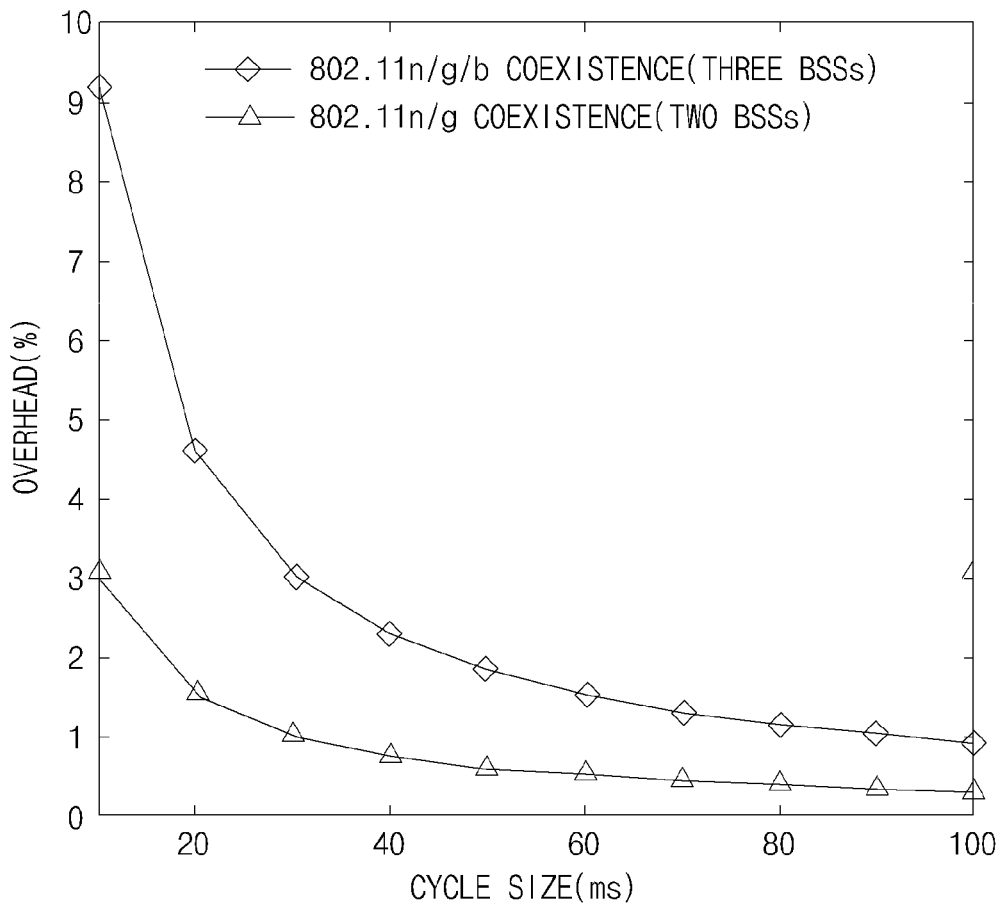
FIGS. 11 to 16 are graphs showing the results of simulations.

FIG. 11 illustrates the overhead according to the fourth embodiment as a function of cycle length. Even if the cycle length is 10 ms, which is sufficiently short for real-time applications, the total overhead is less than 3% in the case when there are two vBSSs of 802.11g and 802.11n. The overhead has increased to 9% for the case of three vBSSs. According to these results, the conclusion that the fourth embodiment can support real-time applications with less than 10% overhead has been reached.

This embodiment of the present invention can be applied to compromise mismatch between IEEE 802.11e Enhanced Distributed Channel Access (EDCA) and the EDCA in 802.11n. As shown in the following Table 1, two standards 802.11e and 802.11n use different parameters, and 802.11e stations may suffer from improperly long delays due to a large Contention Window (CW) and an Arbitration Inter-Frame Space (AIFS). Compared to this, the embodiment of the present invention is configured such that stations based on respective standards are isolated by virtual APs, and thus the performance improvements can be expected for both of the groups.

TABLE 1

|  | 802.11e Voice | 802.11e Video | 802.11n Voice | 802.11n Video |
|---|---|---|---|---|
| ($CW_{min}$, $CW_{max}$) | (7, 15) | (15, 31) | (3, 7) | (7, 15) |
| AIFS (μs) | 50 | 50 | 28 | 28 |

Next, the results of a simulation required to verify the performance of the embodiments of the present invention will be described.

In the simulation, it is assumed that one 802.11n station and one legacy station are present and each station always has a packet to be transmitted. Each station transmits data to the same physical AP at the highest possible data rate: 600 Mb/s for 802.11n, 54 Mb/s for 802.11g, and 11 Mb/s for 802.11b. Also, 2 Mb/s or 6 Mb/s Request to Send/Clear to Send (RTS/CTS) exchange is initiated by the 802.11n transmitter when the 802.11b or 802.11g station is present. A beacon interval is 100 ms, and a CP duration is 50 ms.

Figure 12:
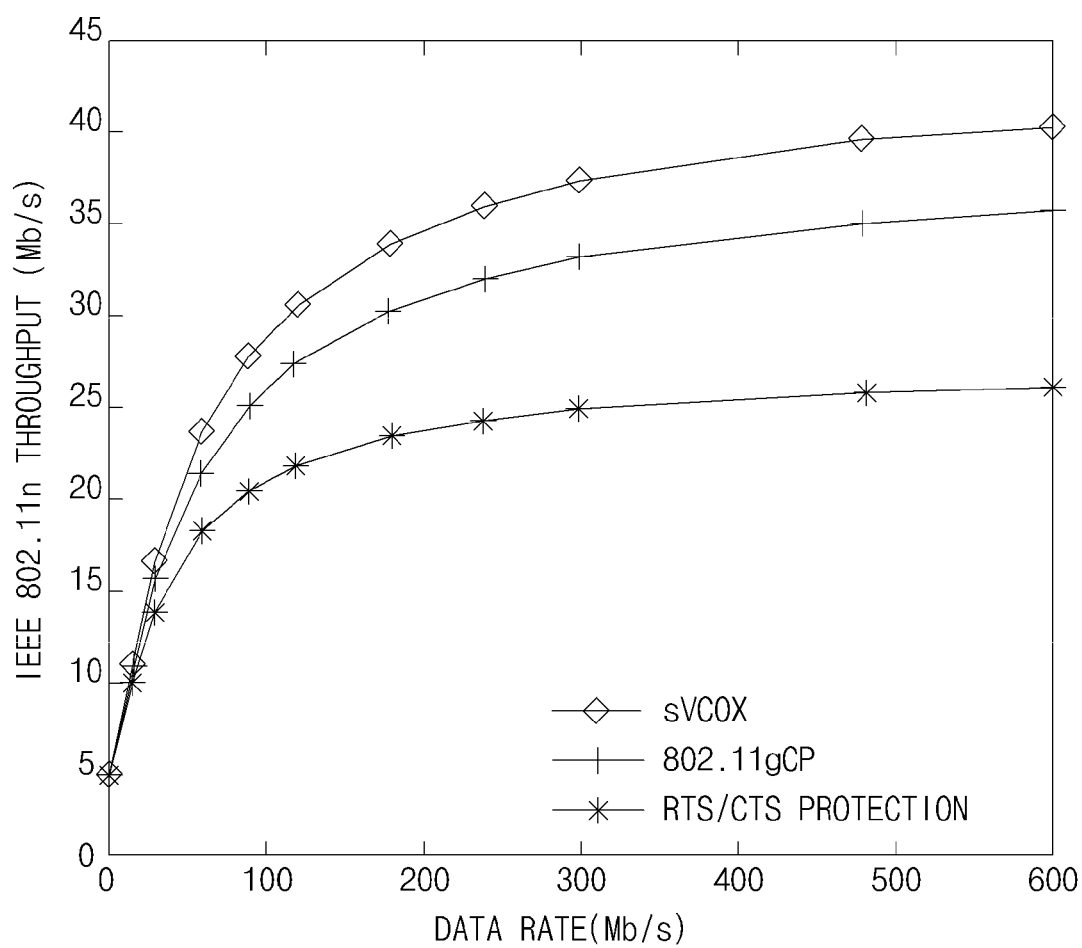

FIG. 12 illustrates the results of comparison performed in the case when the embodiment of the present invention, an 802.11 group-based protection (802.11gCP) scheme, and an RTS/CTS protection scheme are respectively used when 802.11g and 802.11n stations coexist. For a fair comparison, even in the embodiment of the present invention, the same amount of time that 802.11gCP spends transmitting the 802.11g traffic is allocated to the 802.11g station. Since the 802.11gCP has a period in which RTS/CTS are not present, it results in performance improvements compared to the case when RTS/CTS protection is used. When the 802.11g and 802.11n stations contend with each other in 802.11gCP, RTS/CTS protection is used again for 802.11n traffic. However, in the embodiment of the present invention, the use of such RTS/CTS can be reduced, thus further improving uplink performance. When the guard time is extended to a downlink, backoff overhead appearing during the CFP is eliminated, thus also improving downlink performance.

Figure 13:
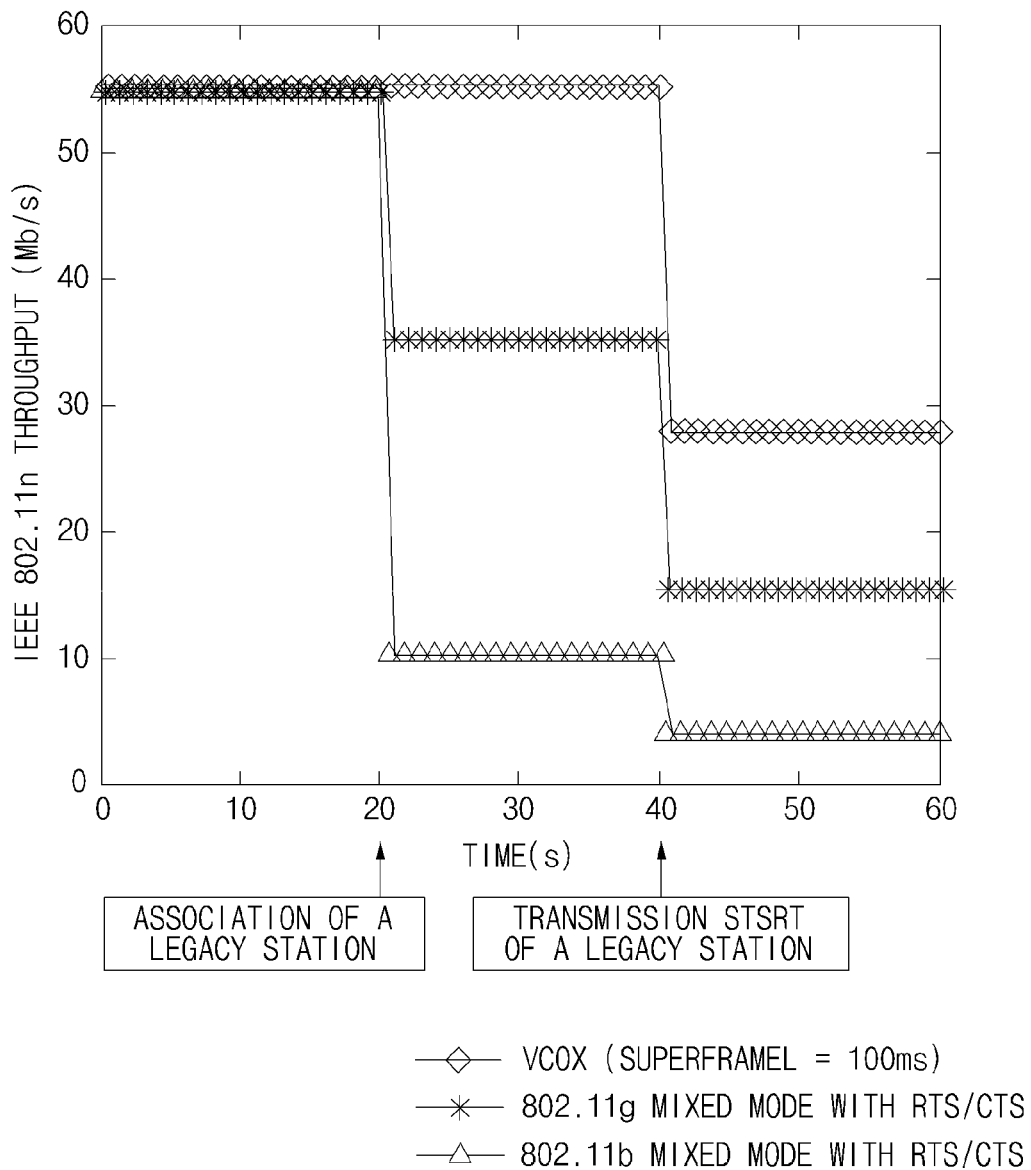

FIG. 13 illustrates the case when a legacy station is associated after 20 seconds have elapsed, and then starts to perform transmission after another 20 seconds have elapsed. In this way, the influence of protection overhead can be distinguished from transmission based on a legacy data rate. FIG. 13 shows the influence of a legacy station on 802.11n uplink performance. When the legacy station is associated, the performance of the embodiment of the present invention is maintained. However, it can be seen that, in the case of 802.11g and 802.11b data rates, as RTS/CTS have been exchanged, the performances of 802.11g and 802.11b data rates decrease to 63% and 18.5% of their original uplink throughputs, respectively. When the legacy station starts to perform transmission after 40 seconds have elapsed, the embodiment of the present invention shares the bandwidth corresponding to half of the time duration assigned thereto.

Figure 14:
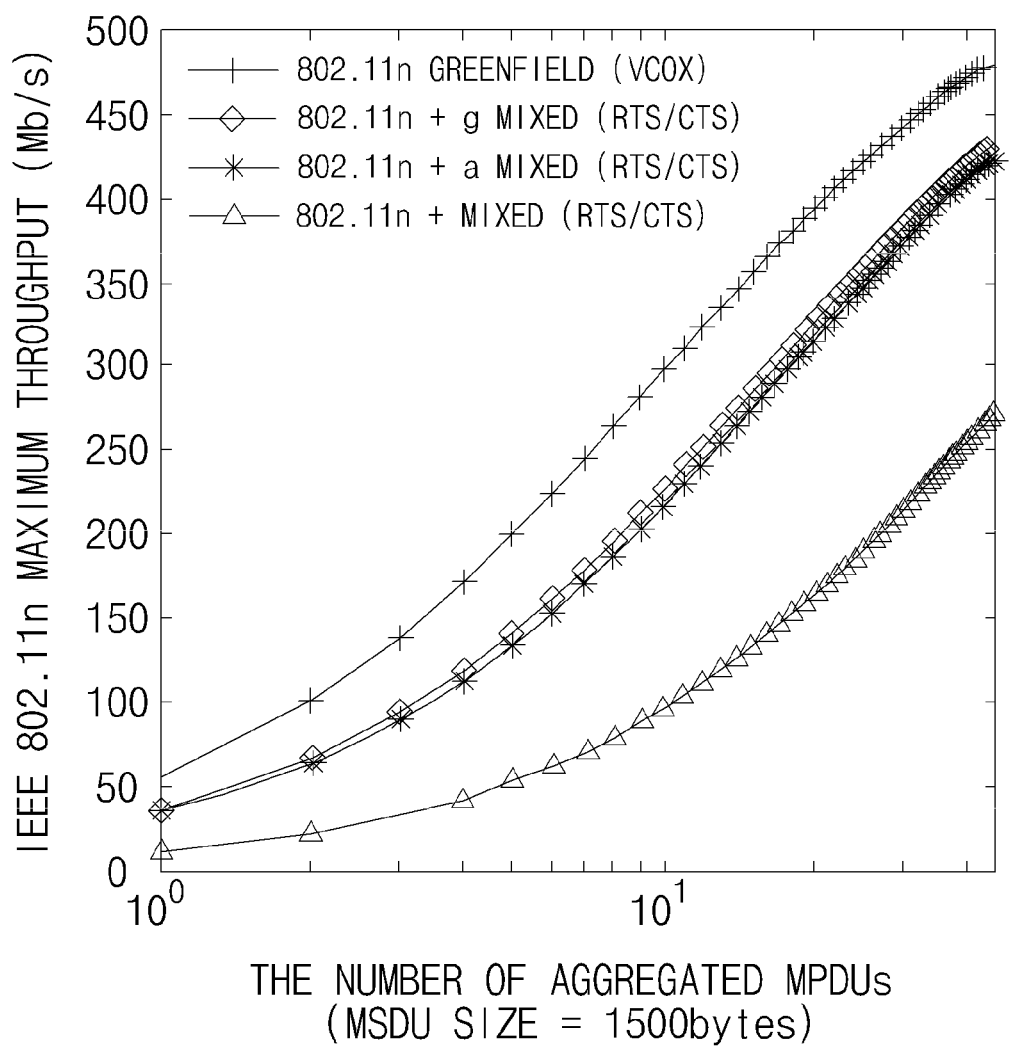

FIG. 14 illustrates the uplink performance of 802.11n using frame aggregation at the presence of a legacy station. Here, Aggregated-MAC Protocol Data Unit (A-MPDU) is used for a data frame of size 1500 bytes supporting a Block ACK. The frame aggregation was originally designed to cope with burdensome protocol overhead. However, RTS/CTS protection overhead can be hardly overcome through frame aggregation. In addition, 802.11n targeted the net throughput of 100 Mb/s to support sufficient bandwidth for next-generation home and office networks. To meet this goal, the embodiment of the present invention is required to aggregate two HT-Greenfield frames whereas other RTS/CTS protection schemes requires three to ten mixed mode frames, thereby causing more delay.

In the following scenario, bandwidth separation performance according to the embodiment of the present invention when there is transmission based on a legacy data rate is shown. With a low rate transmission, overall network performance degraded because the low rate transmission consumes too many wireless resources which should have been used by others. Similarly, 802.11n throughput degraded with legacy transmission by nature; moreover, rate gap between legacy and 802.11n PHY was greater than ever. However, in the embodiment of the present invention, the consumption of resources by the legacy station may be bounded.

Figure 15:
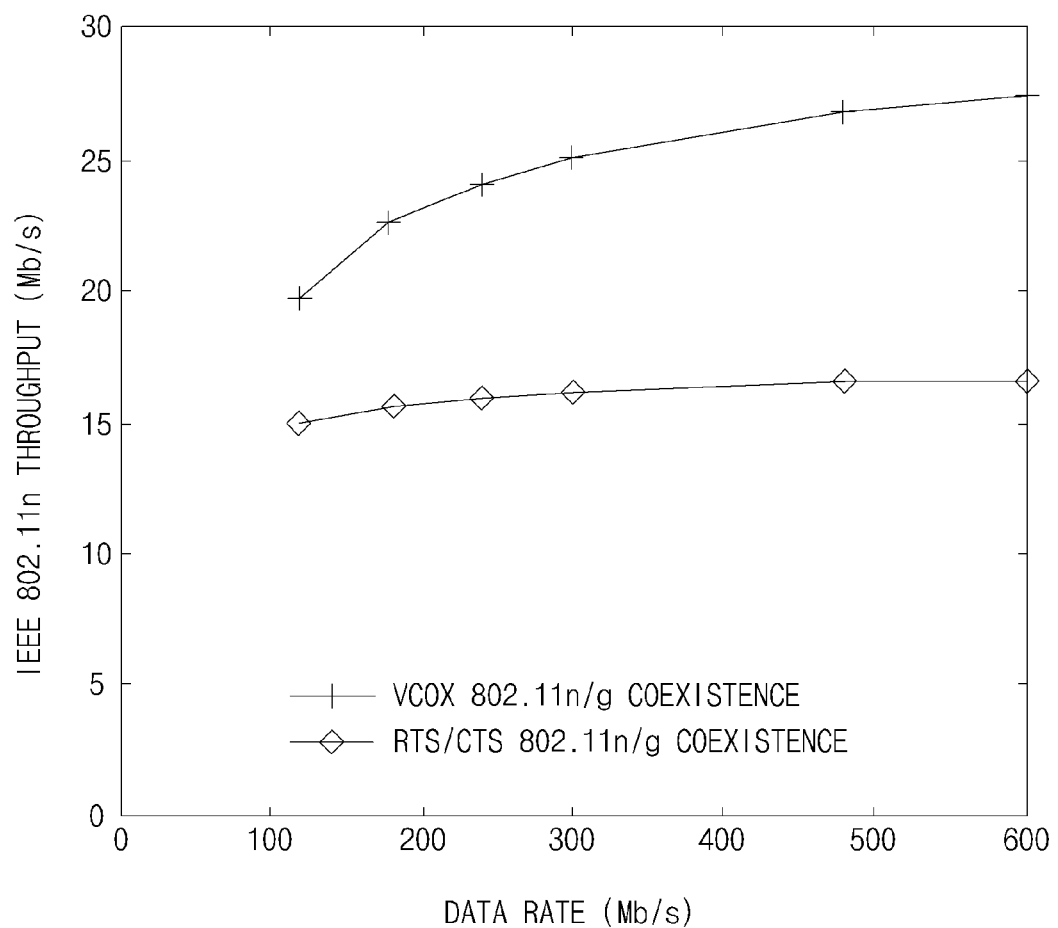

FIG. 15 illustrates the case when 802.11n and 802.11g stations are transmitting at the same time. The 802.11g data rate is fixed at 54 Mb/s. The performance of 802.11n with RTS/CTS protection did not improve as the data rate increased because 802.11g transmission gained the same opportunity to access wireless medium, consuming more time at each access. Compared to this, the embodiment of the present invention can effectively isolate these effects within allocated time, so performance can increase with the data rate.

Figure 16:
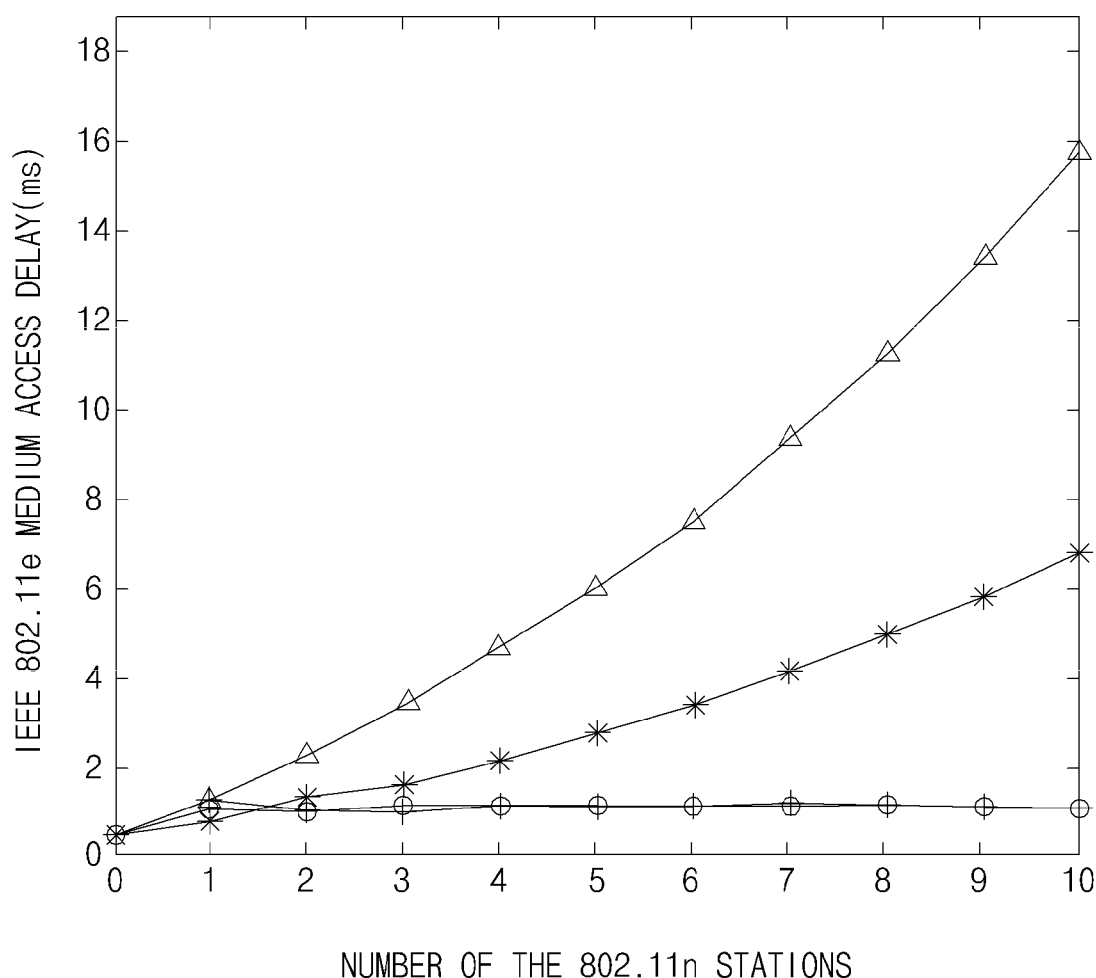

The final simulation examined delay control in the context of 802.11n and 802.11e coexistence. FIG. 16 shows the delay experienced by an 802.11e station with a varying number of 802.11n stations. Access delay increased when the priority was lower than the other contenders and, in this case, 802.11e video had the lowest priority. RTS/CTS protection from 802.11n made the delays even worse. In the embodiment of the present invention, the delay is bounded by a dedicating time interval for each virtual group.

According to the present invention, there is an advantage in that vBSSs can be effectively isolated from each other using both Time Division Multiplexing (TDM) and beacon frames, thus providing two or more services using one AP without causing a collision or interference. That is, individual vBSSs can isolate and use network resources and bandwidth by using one AP.

In particular, when the present invention is used as a method of maintaining backward compatibility based on WLAN standards, an 802.11n station and a legacy station are isolated by TDM-based WLAN virtualization, so that the throughput of both the legacy station and the 802.11n station can be improved, and almost the maximum performance may be reached in a time portion allocated to each station.

Furthermore, since the allocation of times to individual stations can be differently adjusted, the present invention can support QoS requirements for real-time applications.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An Access Point (AP), the AP providing access to a wireless communication network, the wireless communication network comprising:
   a plurality of stations corresponding to a plurality of virtual Basic Service Sets (vBSSs), wherein:
   each of the vBSSs is operated on a superframe basis, the superframe being scheduled by a beacon frame transmitted from the AP;
   the superframe includes the beacon frame, one Contention-Free Period (CFP), and one Contention Period (CP) and the superframe further includes a guard time after the CP; and the CPs of the vBSSs include intervals which do not overlap each other; and
   when the vBSSs are classified into stations which use different Wireless Local Area Network (WLAN) standards, the superframe is scheduled such that a CP of a vBSS based on a WLAN standard of recent technology is located at a latter place; and
   the guard time is inserted only after a CP of a superframe located at a last place.

2. The AP according to claim 1, wherein the superframe further includes, after the CFP, a CF-End control frame enabling the CFP to terminate earlier than a scheduled time.

3. An Access Point (AP), the AP providing access to a wireless communication network, the wireless communication network comprising:
   a plurality of stations corresponding to a plurality of virtual Basic Service Sets (vBSSs), wherein:
   each of the vBSSs is operated on a superframe basis, the superframe being scheduled by a beacon frame transmitted from the AP;
   the superframe includes the beacon frame, one Contention-Free Period (CFP), and one Contention Period (CP); and
   the CPs of the vBSSs include intervals which do not overlap each other; and
   when the vBSSs are classified into stations which use different WLAN standards, the superframe is scheduled such that a CP of a vBSS based on a WLAN standard of recent technology is located at a latter place; and
   a CF-End control frame is inserted only after CFPs of remaining superframes excluding a superframe located at a last place.

4. The AP according to claim 1, wherein the superframe further includes, after the CP, a first downlink interval used to transmit a packet from the AP to a corresponding station.

5. The AP according to claim 4, wherein:
   the AP observes whether a remaining CP is less than that required for packet transmission;
   when the remaining CP is greater than that required for packet transmission, the AP performs downlink transmission during the first downlink interval; and
   when the remaining CP is less than that required for packet transmission, the AP delays downlink transmission.

6. The AP according to claim 4, wherein the superframe further includes, before the CP, a second downlink interval used to transmit a packet from the AP to the station.

7. The AP according to claim 1, wherein the AP allocates times to superframes corresponding to the plurality of vBSSs at different rates or frequencies.

8. A Wireless Local Area Network (WLAN) virtualization system, the system comprising:
   an Access Point (AP) for providing a plurality of virtual Basic Service Sets (vBSSs);and
   a plurality of stations corresponding to the vBSSs provided by the AP, wherein:
   each of the vBSSs is operated on a superframe basis, the superframe being scheduled by a beacon frame transmitted from the AP;
   the superframe includes the beacon frame, one Contention-Free Period (CFP), and one Contention Period (CP) and the superframe further includes a guard time after the CP; the CPs of the vBSSs include intervals which do not overlap each other; and
   when the vBSSs are classified into stations which use different Wireless Local Area Network (WLAN) standards, the superframe is scheduled such that a CP of a vBSS based on a WLAN standard is located at a latter place; and
   the guard time is inserted only after a CP of a superframe located at a last place.

9. The WLAN virtualization system according to claim 8, wherein each of the stations of the vBSSs sets up a Network Allocation Vector (NAV) so as not to contend for transmission with other stations during the CFP.

10. The WLAN virtualization system according to claim 8, wherein the vBSSs are classified according to any scheme at a request of a service provider.

11. The WLAN virtualization system according to claim 8, wherein the CPs of the vBSSs do not overlap each other.

12. A method of providing access to a wireless communication network, in which an Access Point (AP) provides access to the wireless communication network to a plurality of stations corresponding to a plurality of virtual Basic Service Sets (vBSSs), comprising:
   the AP transmitting a beacon frame required to schedule a superframe corresponding to an operation cycle of each vBSS,
   wherein the superframe includes the beacon frame, one Contention-Free Period (CFP), and one Contention Period (CP) and the superframe further includes a guard time after the CP, and wherein the CPs of the vBSSs include intervals which do not overlap each other; and
   when the vBSSs are classified into stations which use different Wireless Local Area Network (WLAN) standards, the superframe is scheduled such that a CP of a vBSS based on a WLAN standard is located at a latter place; and
   the guard time is inserted only after a CP of a superframe located at a last place.

13. The AP according to claim 1, wherein the vBSSs are classified according to any scheme at a request of a service provider.

14. The AP according to claim 1, wherein the vBSSs are classified according to at least one selected from a group of physical layer, Quality of Service (QoS), security level, and network access authority.

15. The AP according to claim 1, wherein the CPs of the vBSSs do not overlap each other.

16. The AP according to claim 1, wherein the beacon frame includes a length of the CFP and a size of the superframe.

17. The AP according to claim 1, wherein the superframe is formed such that a superframe of a vBSS defined later is delayed by a CP of a vBSS defined earlier.

18. The AP according to claim 1, wherein the beacon frame is transmitted during a CFP of another vBSS.

* * * * *